United States Patent
Lee et al.

(10) Patent No.: US 10,532,650 B2
(45) Date of Patent: Jan. 14, 2020

(54) DRIVE MOTOR COOLED BY HEAT EXCHANGE WITH COOLANT AND ECO-FRIENDLY VEHICLE USING THE SAME

(71) Applicants: HYUNDAI MOTOR COMPANY, Seoul (KR); KIA MOTORS CORPORATION, Seoul (KR)

(72) Inventors: Jung-Woo Lee, Hwaseong-si (KR); Dong-Yeon Han, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 117 days.

(21) Appl. No.: 15/833,792

(22) Filed: Dec. 6, 2017

(65) Prior Publication Data
US 2018/0170169 A1    Jun. 21, 2018

(30) Foreign Application Priority Data
Dec. 16, 2016    (KR) ........................ 10-2016-0172402

(51) Int. Cl.
| *H02K 9/00* | (2006.01) |
| *H02K 9/20* | (2006.01) |
| *B60K 11/02* | (2006.01) |
| *B60K 1/00* | (2006.01) |
| *H02K 5/20* | (2006.01) |
| *H02K 9/193* | (2006.01) |

(52) U.S. Cl.
CPC ............... *B60K 11/02* (2013.01); *B60K 1/00* (2013.01); *H02K 5/20* (2013.01); *H02K 9/193* (2013.01); *B60K 2001/006* (2013.01)

(58) Field of Classification Search
CPC .... B60K 11/02; B60K 1/00; B60K 2001/006; H02K 5/20; H02K 9/19; H02K 9/193
USPC ........................................................... 310/54
See application file for complete search history.

(56) References Cited

U.S. PATENT DOCUMENTS

| 6,323,613 | B1 * | 11/2001 | Hara ...................... | H02K 11/33 |
| | | | | 318/471 |
| 10,272,767 | B1 * | 4/2019 | Tang ...................... | B60K 11/04 |
| 2011/0298315 | A1 * | 12/2011 | Fulton ..................... | H02K 5/20 |
| | | | | 310/54 |
| 2012/0153718 | A1 * | 6/2012 | Rawlinson ............... | H02K 5/20 |
| | | | | 307/10.1 |
| 2013/0038151 | A1 * | 2/2013 | Ohashi .................... | H02K 1/32 |
| | | | | 310/59 |
| 2013/0119793 | A1 * | 5/2013 | Hofkirchner ............ | H02K 5/20 |
| | | | | 310/54 |

(Continued)

FOREIGN PATENT DOCUMENTS

| JP | 2005-278319 A | 10/2005 |
| JP | 2009-121549 A | 6/2009 |

(Continued)

*Primary Examiner* — Yuriy Semenenko
(74) *Attorney, Agent, or Firm* — Morgan, Lewis & Bockius LLP

(57) ABSTRACT

A drive motor includes a coolant channel in which coolant is circulated around a motor housing surrounding the stator, and an oil path in which the temperature of oil decreases by heat exchange between the oil and the coolant in a motor internal space defined by a motor cover and a reducer cover that are coupled to the respective left and right sides of the motor housing.

15 Claims, 4 Drawing Sheets

(56) References Cited

U.S. PATENT DOCUMENTS

2016/0105084 A1* 4/2016 Ishimaru .................. H02K 5/15
310/54

FOREIGN PATENT DOCUMENTS

| JP | 2010-104206 A | 5/2010 |
| KR | 10-2013-0027512 A | 3/2013 |
| KR | 10-2016-0050197 A | 5/2016 |

* cited by examiner

—·— COOLANT CHANNEL, 30: 31, 32
------- OIL PATH, 20: 21, 22, 23, 24

DRIVE MOTOR COOLED BY HEAT EXCHANGE WITH COOLANT AND ECO-FRIENDLY VEHICLE USING THE SAME

CROSS-REFERENCE TO RELATED APPLICATIONS

This application claims the benefit of priority to Korean Patent Application No. 10-2016-0172402, filed on Dec. 16, 2016, which is incorporated herein by reference in its entirety.

TECHNICAL FIELD

The present disclosure relates to a drive motor, and particularly, to an eco-friendly vehicle using a drive motor with improved cooling performance in such a manner that oil is cooled by heat exchange with coolant.

BACKGROUND

In general, drive motors for eco-friendly vehicles are used to implement a traveling mode in which EVs (Electric Vehicles) are driven by motors alone and a traveling mode in which HEVs (Hybrid Electric Vehicles) are driven by combination of motors and engines.

These eco-friendly vehicles are hybrid vehicles, and includes EVs (Electric Vehicles), HEVs (Hybrid Electric Vehicles), PHEVs (Plug-in Hybrid Electric Vehicles), FCEVs (Fuel Cell Electric Vehicles), MHEVs (Mild Hybrid Electric Vehicles), etc.

Such a drive motor includes a stator around which a coil is wound and which is coupled in a motor housing, and a rotor that is disposed in the stator with a predetermined gap interposed therebetween. The drive motor is provided with a cooling structure that cools heat generated by the current applied to the coil and the eddy current due to counter electromotive force.

This cooling structure uses indirect and direct cooling methods that are classified according to the method of cooling main heating parts and parts required for intensive cooling, such as a stator, a bearing, and a magnet of a drive motor.

For example, the indirect cooling method is a method of circulating coolant to a stator, a bearing, and a magnet of a drive motor to indirectly cool the inside of the drive motor. The indirect cooling method enables the cooling efficiency of the stator to be enhanced while enabling the drive motor to have a simple structure in which a coolant channel in a motor housing is used For example, the direct cooling method is a method of circulating oil within a drive motor and a reducer, to main heating parts and parts required for cooling to directly cool the inside of the drive motor. The direct cooling method enables the cooling efficiency of a bearing and a magnet to be enhanced by a coolant channel formed in the drive motor while enabling a stator to be cooled by forming an oil path in the drive motor.

Accordingly, in the eco-friendly vehicles, it is possible to prevent damage to the drive motor due to deterioration during driving of the drive motor and maintain the performance of the drive motor by applying one or both of the indirect and direct cooling methods to the drive motor.

However, among the part required for intensive cooling, it is difficult for the indirect cooling method to secure the cooling performance of the bearing and the magnet compared to the stator. It is advantageous for the direct cooling method to secure the cooling performance of the stator, the bearing, and the magnet, but it is necessary to sufficiently secure a flow rate of oil.

Therefore, a separate cooling system has to be provided to the drive motor to which the combination of the indirect and direct cooling methods is applied.

For example, an HEV vehicle, which uses an engine and a motor together, requires an ATF (Auto Transmission Fluid) motor circulation system to supply ATF to the motor. For another example, an EV vehicle, which uses only a motor, requires a cooling system including an oil cooler to cool oil in the motor and a reducer.

For this reason, the application of the drive motor, to which the combination of the indirect and direct cooling methods is applied, to the HEV or EV vehicle causes an increase in cost due to the additional system, which may lead to a decrease in the price competitiveness of the eco-friendly vehicle.

SUMMARY

An embodiment of the present disclosure is directed to a drive motor cooled by heat exchange with coolant, which is capable of having improved cooling performance without using an oil cooler by lowering a temperature of oil by heat exchange between oil circulated in the motor for direct cooling and coolant circulated in a motor housing for indirect cooling, and particularly, which is capable of having high speed and enhanced durability by applying an oil-lubricated bearing, having a higher allowable speed than a dry bearing, to the drive motor by virtue of the improved cooling performance, and an eco-friendly vehicle using the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a drive motor includes: a coolant channel in which coolant circulates around a stator supplied with a current; and an oil path in which a temperature of oil decreases by heat exchange between the oil and the coolant while the oil passes around the coolant channel.

The stator may be covered by a motor housing, a motor cover may be coupled to one side of the motor housing, and a reducer cover is coupled to the other side of the motor housing. The coolant channel may include vertical channels formed along a circumference of the motor housing and horizontal channels formed in a longitudinal direction of the motor housing, wherein the horizontal channels may be connected to both ends of an associated one of the vertical channels. The oil path may be formed by the motor cover, the reducer cover, and the motor housing.

The oil path may include a shaft path, a motor cover path, a motor housing path, and a reducer cover path, the shaft path may be formed in the motor shaft, the motor cover path may be formed in the motor cover, the motor housing path may be formed in the motor housing so as to be disposed adjacent to the coolant channel, and the reducer cover path may be formed in the reducer cover.

The stator may surround a magnet coupled to the motor shaft. The motor shaft may be supported by a motor front end bearing as an oil-lubricated bearing and a motor rear end bearing, and may be connected to a hollow reducer shaft in which the oil flows, the reducer shaft constituting a reducer filled with the oil.

In accordance with another embodiment of the present disclosure, an eco-friendly vehicle includes a drive motor including a hollow motor shaft coupled to a magnet surrounded by a stator supplied with a current so that both portions of the motor shaft are supported by oil-lubricated bearings, a coolant channel in which coolant circulates around a motor housing surrounding the stator, and an oil path in which a temperature of oil decreases by heat exchange between the oil and the coolant in a motor internal space defined by a motor cover and a reducer cover that are coupled to respective left and right sides of the motor housing, and a coolant circulation system configured to circulate the coolant by the drive motor.

The drive motor may be filled with the oil circulated inside the drive motor for cooling action, and the oil may exchange heat with the coolant so that the temperature of the oil is lowered.

The coolant circulation system may be connected to the motor housing by a coolant line to circulate the coolant.

DETAILED DESCRIPTION OF SPECIFIC EMBODIMENTS

Figure 1:
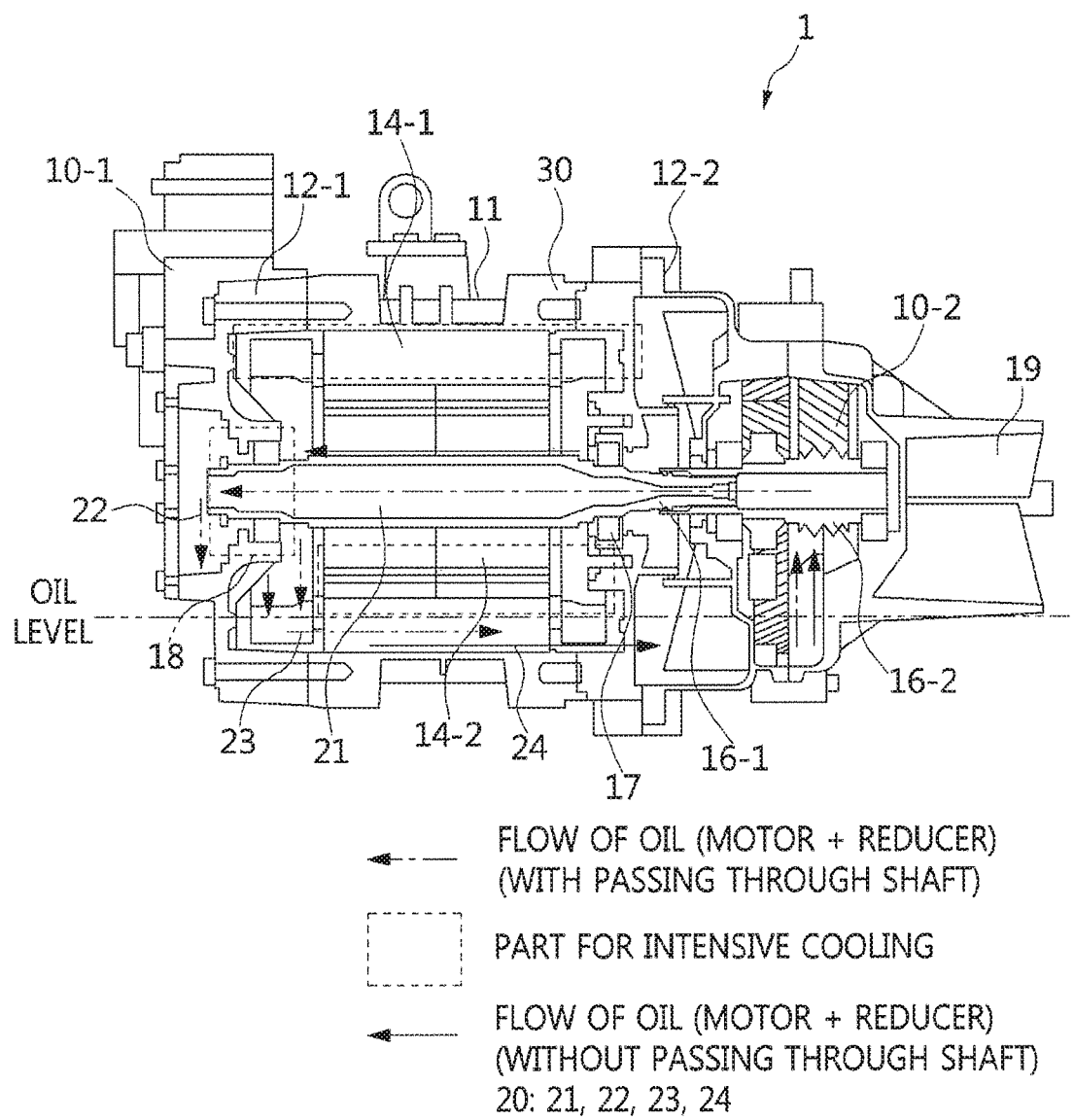
FIG. 1 is a cross-sectional view illustrating a drive motor cooled by heat exchange with coolant through an oil path and a coolant channel according to an embodiment of the present disclosure.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Referring to FIG. 1, a drive motor 1 includes a motor body 10-1 and a reducer 10-2.

The motor body 10-1 includes a motor component part that has a motor shaft 16-1 and generates power, and a cooling component part that cools motor components. A portion of the internal space of the motor body 10-1 is filled with oil 19 for friction reducing and cooling action, and the oil is circulated therein. The reducer 10-2 includes a reducer shaft 16-2 that is rotatably connected to the motor shaft 16-1, and a plurality of gears for deceleration and an increase in torque. A portion of the internal space of the reducer 10-2 is filled with the oil 19 for friction reducing and cooling action, and the oil is circulated to the motor body 10-1.

For example, the oil 19 is accommodated beneath the motor shaft 16-1 in which the motor body 10-1 is horizontally placed. Therefore, the oil 19 wets a portion of a stator 14-1 in the internal space of the motor body 10-1, and an inner circulation flow is formed in which the oil passes through an oil path 20 by centrifugal force generated by rotation of a magnet 14-2 and the motor shaft 16-1.

Accordingly, when the drive motor 1 is driven, the rotational force of the motor body 10-1 is transmitted to the reducer 10-2 through the motor shaft 16-1 and the reducer shaft 16-2 by connecting the motor shaft 16-1 of the motor body 10-1 to the reducer shaft 16-2 of the reducer 10-2, so that power is output from the reducer 10-2 to a reducer output shaft (not shown).

Specifically, the cooling component part includes an oil path 20 through which oil is circulated in the motor, and a coolant channel 30 through which coolant is circulated on the surface of the motor. For example, the oil path 20 consists of a shaft path 21, a motor cover path 22, a motor housing path 23, and a reducer cover path 24, and forms a flow in which oil passes through a shaft.

However, the oil path 20 may consist of the motor cover path 22, the motor housing path 23, and the reducer cover path 24, and may form a flow in which oil passes through no shaft whereby oil does not pass through the shaft path 21. The flow in which oil passes through no shaft is an inner circulation flow in which the oil 19 flows from the motor cover path 22 through the motor housing path 23 to the reducer cover path 24 by centrifugal force generated by rotation of the magnet 14-2 and the motor shaft 16-1. Therefore, since the flow in which oil passes through no shaft is similar to the flow in which oil passes through a shaft, except for the shaft path 21, an additional description thereof will be omitted.

The shaft path 21 is formed by the hollow motor shaft 16-1 and the hollow reducer shaft 16-2. In the shaft path 21, one end of the reducer shaft 16-2 is formed as an inlet for introduction of the oil 19, and one end of the motor shaft 16-1, which is not connected to the reducer shaft 16-2, is formed as an outlet for discharge of the oil 19.

The motor cover path 22 is formed in a motor cover 12-1, and the oil 19 discharged from the shaft path 21 flows through the motor cover path 22 to a motor housing 11 having the coolant channel 30 in the rear internal space of the motor cover 12-1. Particularly, the motor cover path 22 is formed by combination of the rear internal space of the motor cover 12-1, in which the oil 19 discharged from the shaft path 21 is collected, and a motor-cover oil path that is dented by the thickness of the motor cover 12-1 so as to lead to the motor housing 11. For example, the motor-cover oil path may be formed of a hole or groove that extends vertically and horizontally. However, when the motor cover 12-1 is formed with a rear internal space that allows the oil 19 to flow to the motor housing 11, the motor-cover oil path may be formed of a rear-inner-space oil path that directly uses the structure of the motor cover 12-1 without using the thickness of the motor cover 12-1.

The motor housing path 23 is formed in the motor housing 11, and the oil 19 discharged from the motor cover path 22 flows through the motor housing path 23 to a reducer cover 12-2 in a state in which the oil is cooled by heat exchange with the coolant in the coolant channel 30. Particularly, the motor housing path 23 is adjacent to the coolant channel 30 in order to increase heat exchange between oil and coolant.

The reducer cover path 24 is formed in the reducer cover 12-2, and the oil 19 discharged from the motor housing path 23 flows through the motor cover path 24 to the front internal space of the reducer cover 12-2. Particularly, the reducer cover path 24 is formed by combination of the front internal space of the reducer cover 12-2, in which the oil 19 discharged from the motor housing path 23 is collected, and a reducer-cover oil path that is dented by the thickness of the reducer cover 12-2 so as to lead to the motor housing 11. For example, the reducer-cover oil path may be formed of a hole or groove that extends vertically and horizontally. However, when the reducer cover 12-2 is configured such that the oil 19 directly flows to the front internal space of the reducer cover 12-2 without passing through the reducer-cover oil path, the reducer-cover oil path may not be formed.

For example, the coolant channel 30 is formed by the motor housing 11 so as to be adjacent to the motor housing path 23 formed in the motor housing 11, thereby forming a coolant path in which coolant flows. Particularly, the coolant channel 30 may be formed of a rectilinear or curved groove that has a coolant inlet for introduction of coolant and a coolant outlet for discharge of coolant.

Specifically, the motor component part includes a motor case, a stator 14-1, a magnet 14-2, a motor shaft 16-1, a shaft bearing, and oil 19.

For example, the motor case includes the motor housing 11, the motor cover 12-1, and the reducer cover 12-2. The motor housing 11 surrounds the motor body 10-1 to block the inside of the motor body 10-1 from the outside, and forms the coolant channel 30 connected to the oil path 20. The motor cover 12-1 is coupled to one side of the motor housing 11 to formed the rear portion of the motor body 10-1, and forms the oil path 20 connected to the motor housing 11. The reducer cover 12-2 is coupled to the other side of the motor housing 11 (the opposite portion of the motor cover 12-1) to form the front portion of the motor body 10-1. The reducer cover 12-2 is coupled to the reducer 10-2. Particularly, the motor housing 11, the motor cover 12-1, and the reducer cover 12-2 form a sealing structure to prevent the oil 19 therein from leaking. The sealing structure is typically formed using packing or a seal.

For example, the stator 14-1 is formed in the drive motor 1 by winding a coil around a bobbin. The magnet 14-2 is surrounded by the stator 14-1, and is rotated by electromagnetic force generated by the current supplied to the stator 14-1 to rotate the motor shaft 16-1. Therefore, the magnet 14-2 is typically coupled to the motor shaft 16-1.

For example, the motor shaft 16-1 is a hollow shaft for introduction and discharge of the oil 19, and is axially arranged in the motor body 10-1. The motor shaft 16-1 generates power of the drive motor 1 by rotating along with the magnet 14-2. Particularly, the motor shaft 16-1 is connected to the reducer shaft 16-2 to output the power of the drive motor 1 to the reducer 10-2.

For example, the shaft bearing includes a motor shaft bearing that supports the motor shaft 16-1 and a reducer shaft bearing that supports the reducer shaft 16-2. The motor shaft bearing includes a motor front end bearing 17 that supports a front end of the motor shaft 16-1 (an end of the motor shaft which is connected to the reducer shaft 16-2) a motor rear end bearing 18 that supports a rear end of the motor shaft 16-1 (an end of the motor shaft which is not connected to the reducer shaft 16-2). Particularly, an oil-lubricated bearing is used as the motor front end bearing 17 and the motor rear end bearing 18 by virtue of an improvement in cooling efficiency by the oil path 20. As a result, the drive motor 1 has a higher allowable speed than a dry bearing by the oil-lubricated bearing.

For example, the oil 19 is motor oil that is accommodated in the motor body 10-1 and reducer oil that is accommodated in the reducer 10-2. The oil 19 generates friction reducing and cooling action by circulation of oil in the motor body 10-1 and the reducer 10-2 through the oil path 20.

Figure 2:
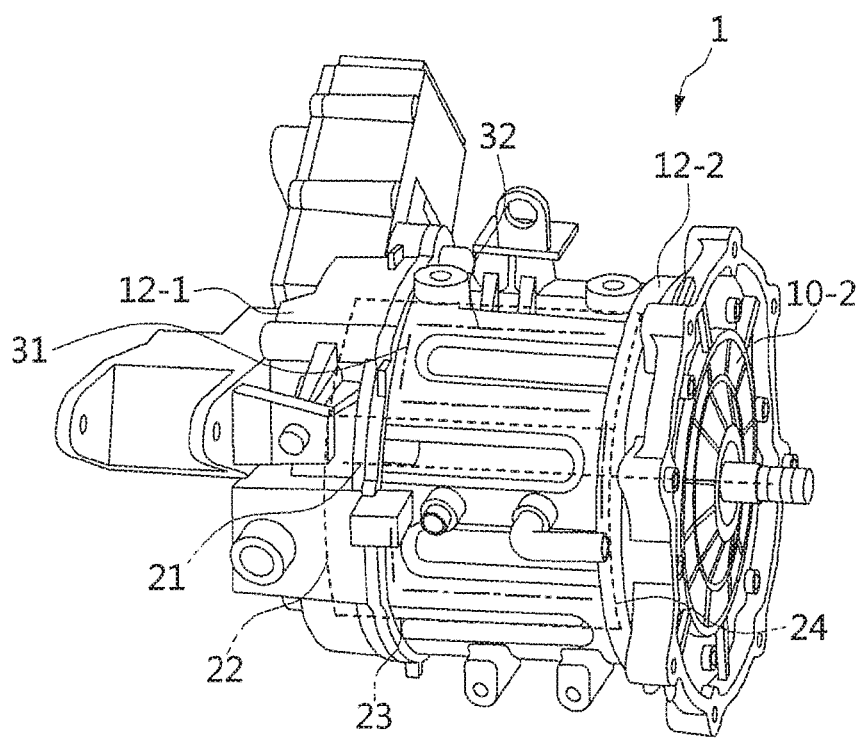
FIG. 2 is a view illustrating an example of the layout of the oil path and the coolant channel applied to the drive motor according to the embodiment of the present disclosure.

FIG. 2 illustrates the layout of the oil path 20 and the coolant channel 30.

For example, the coolant channel 30 includes vertical channels 31 that are formed along the circumference of the motor housing 11 and horizontal channels 32 that are formed in the longitudinal direction of the motor housing 11. Particularly, the horizontal channels 32 are respectively connected to both ends of the associated one of the vertical channels 31 (wherein, the horizontal channels are illustrated as if they are separated from each other in FIG. 2 for convenience sake), to form a "⊓" shape. The horizontal channels forming a "⊓" shape are continuously arranged along the circumference of the motor housing 11 to continuously form a "⊓ ⊔" shape.

For example, the oil path 20 is configured such that the shaft path 21 formed by the motor shaft 16-1 and the reducer shaft 16-2 is axially arranged in the center of the drive motor 1, the motor cover path 22 and the reducer cover path 24 are formed along the respective circumferences of the motor cover 12-1 and the reducer cover 12-2 to be arranged adjacent to the vertical channels 31, and the motor housing path 23 is formed in the longitudinal direction of the motor housing 11 to be disposed adjacent to the horizontal channels 32.

Figure 3:
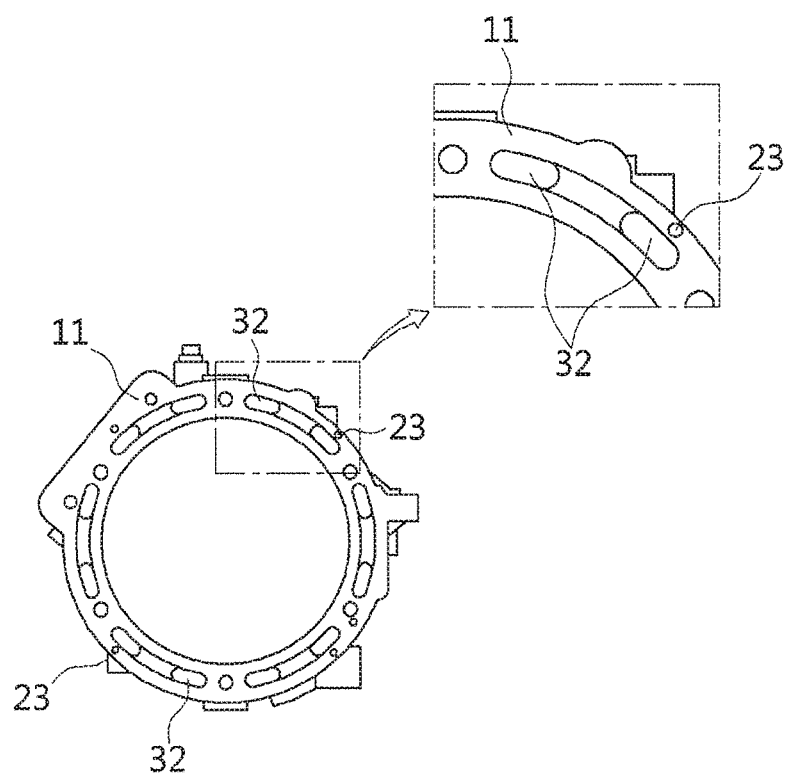
FIG. 3 is a view illustrating an example of the oil path and the coolant channel formed in a motor housing according to the embodiment of the present disclosure.

FIG. 3 illustrates the relationship between the motor housing path 23 of the oil path 20 and the horizontal channels 32 of the coolant channel 30. As illustrated in FIG. 3, the motor housing path 23 has a circular shape whereas each of the horizontal channels 32 has an elongated hole.

Particularly, the motor housing path 23 penetrates the motor housing 11 so as to be disposed above the horizontal channels 32. However, the motor housing path 23 may be disposed beneath the horizontal channels 32. In addition, the motor housing path 23 may be formed in one of two adjacent horizontal channels 32 or in all horizontal channels 32. In addition, the motor housing path 23 may consist of a plurality of motor housing paths arranged along the width of one horizontal channel 32 by adjusting the diameter thereof.

Figure 4:
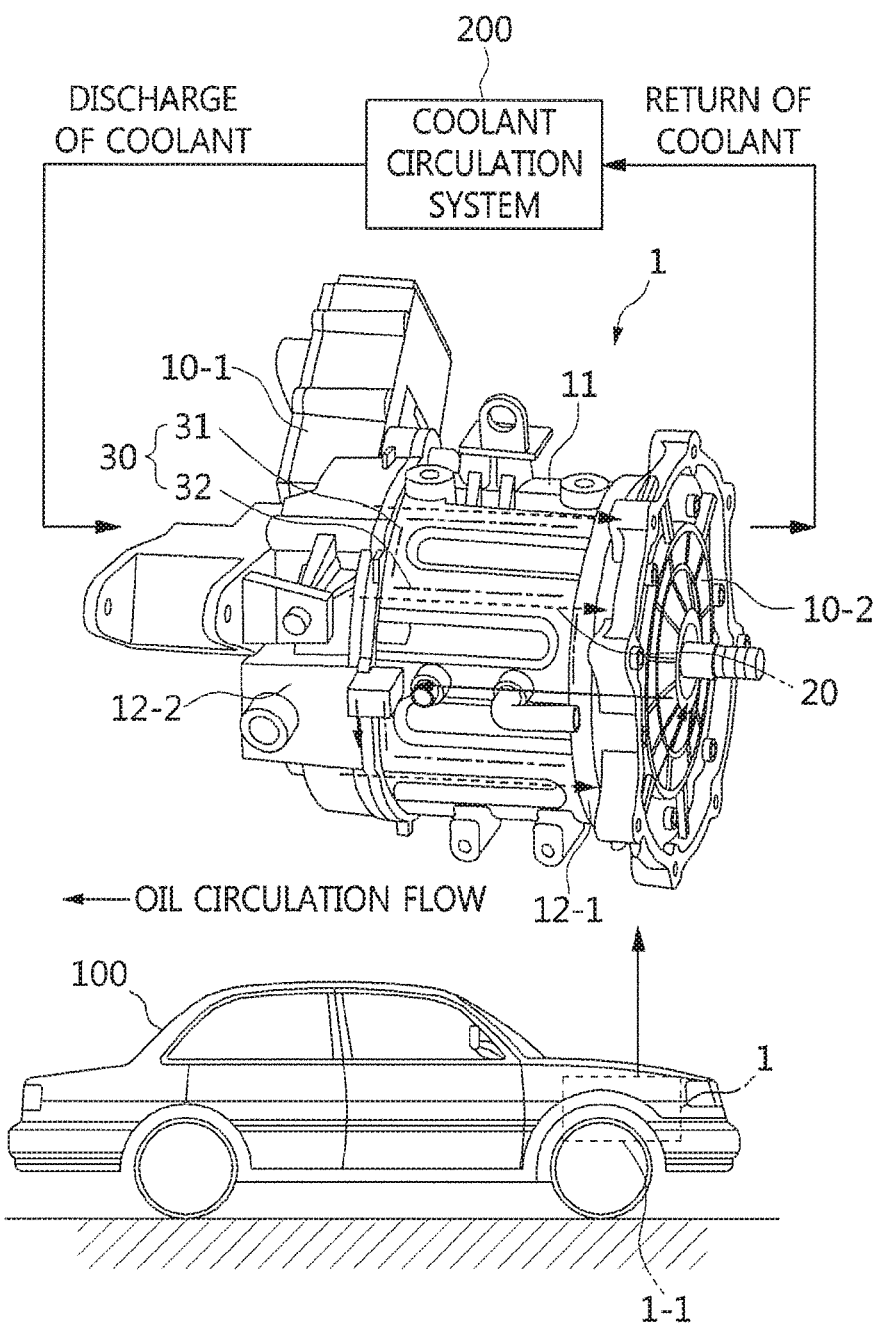
FIG. 4 is a view illustrating a state in which oil flows in an oil path while being cooled by heat exchange with coolant flowing in a coolant channel in a drive motor applied to an eco-friendly vehicle according another embodiment of the present disclosure.

FIG. 4 illustrates an example of an eco-friendly vehicle 100 such as an EV vehicle which includes a drive motor 1, a power transmission device 1-1, and a coolant circulation system 200.

Specifically, the drive motor 1 is similar to the drive motor cooled by heat exchange with coolant which is described in FIGS. 1 and 2. Therefore, the drive motor 1 includes the coolant channel 30 having a continuous "⊓ ⊔" shape, and the oil path 20 that includes the shaft path 21, the motor cover path 22, the motor housing path 23, and the reducer cover path 24.

Specifically, the power transmission device 1-1 transmits the power of the drive motor 1 to vehicle wheels.

Specifically, the coolant circulation system 200 includes a coolant reservoir that is filled with coolant and a pump that pumps coolant, which are not illustrated. The coolant circulation system 200 is connected to the drive motor 1 by coolant lines that are respectively connected to the inlet and the outlet of the coolant channel 30.

Accordingly, when the drive motor 1 is driven, the oil 19 is circulated by centrifugal force generated by rotation of the magnet 14-2 and the motor shaft 16-1 and by a variation in pressure therein. The oil 19 is circulated in the oil path 20 while repeatedly passing through the shaft path 21→the motor cover path 22→the motor housing path 23→the reducer cover path 24→the shaft path 21. Here, the symbol "→" is a sign indicative of the flow direction of the oil 19. As a result, the oil 19 uniformly and effectively cools the motor shaft 16-1, the magnet 14-2, the motor front end bearing 17, the stator 14-1, and the motor rear end bearing 18.

In addition, when the coolant circulation system 200 is operated, the coolant is circulated to the motor housing 11 through the coolant channel 30. As a result, the coolant cools the whole stator 14-1 covered by the motor housing 11 while exchanging heat with the oil 19 flowing through the motor housing path 23 in a state in which it is adjacent to the coolant channel 30. That is, the oil 19, the temperature of which is increased by heating of the motor, discharged from the motor cover path 22 is cooled by heat exchange with coolant while passing through the motor housing path 23, and then flows to the reducer cover path 24. As a result, the stator 14-1 is more effectively cooled by the coolant and the oil 19 having a relatively low temperature.

As described above, the drive motor 1 applied to the eco-friendly vehicle according to the embodiment of the present disclosure includes the hollow motor shaft 16-1 that is coupled to the magnet 14-2 surrounded by the stator 14-1 supplied with a current so that both portions of the shaft are supported by bearings, the coolant channel 30 in which coolant is circulated around the motor housing 11 surrounding the stator 14-1, and the oil path 20 in which the temperature of oil is lowered by heat exchange between the oil and the coolant in the motor internal space defined by the motor cover 12-1 and the reducer cover 12-2 that are coupled to the respective left and right of the motor housing 11. Thus, it is possible to improve the cooling performance of the motor without using an oil cooler and particularly to achieve the high speed and the enhanced durability of the motor by applying the oil-lubricated bearing, which has a higher allowable speed than the dry bearing, to the bearing for supporting the motor shaft 16-1 by virtue of the improved cooling performance.

As apparent from the above description, a drive motor according to exemplary embodiments of the present disclosure has the following advantages and effects by application of a cooling structure using heat exchange with coolant.

Firstly, it is possible to obtain a synergy cooling effect even by oil in a motor and a reducer by cooling oil by heat exchange with coolant. Secondly, since only the oil in the motor and the reducer is used, there is no need to supply an ATF for securing a flow rate of oil or there is no need for an oil cooler for cooling oil. Thirdly, since there is no need for using the ATF and for the oil cooler, the structure of a motor cooling system is simplified. Fourthly, since a bearing is more effectively cooled by oil, an oil-lubricated bearing having high cooling performance compared to a dry bearing can be applied to the motor. Fifthly, it is possible to achieve the high speed and the enhanced durability of the motor by application of the oil-lubricated bearing having a higher allowable speed than the dry bearing.

In addition, since there is no need to supply an ATF to an eco-friendly vehicle using the drive motor of the present disclosure together with an engine as a power source, the structure of the power system can be simplified and the price competitiveness of the eco-friendly vehicle can be significantly increased.

Furthermore, since it is unnecessary to apply the oil cooler for cooling oil to an EV vehicle using the drive motor of the present disclosure as a power source, the structure of the power system can be simplified and the price competitiveness of the eco-friendly vehicle can be significantly increased.

While the present disclosure has been described with respect to the specific embodiments, it will be apparent to those skilled in the art that various changes and modifications may be made without departing from the spirit and scope of the invention as defined in the following claims.

What is claimed is:

1. A drive motor comprising:
   a coolant channel in which coolant circulates around a stator having a current; and
   an oil path in which a temperature of oil decreases by heat exchange between the oil and the coolant while the oil passes around the coolant channel,
   wherein the coolant channel comprises vertical channels along a circumference of a motor housing and horizontal channels in a longitudinal direction of the motor housing, and the oil path is disposed adjacent to the horizontal channels arranged in the longitudinal direction of the motor housing,
   wherein the horizontal channels are connected to both ends of an associated one of the vertical channels, and
   wherein the horizontal channels and the associated one of vertical channels define a "⊓" shape and are continuously arranged along the circumference of the motor housing in a "⊓⊔" shape.

2. The drive motor of claim 1, wherein the drive motor has a motor internal space which is filled with the oil.

3. The drive motor of claim 1, wherein the stator is covered by the motor housing which includes the coolant channel and the oil path.

4. The drive motor of claim 3, wherein the oil path is adjacent to the coolant channel.

5. The drive motor of claim 3, wherein a motor cover is coupled to one side of the motor housing,
   a reducer cover is coupled to the other side of the motor housing, and
   the motor cover and the reducer cover block the motor internal space from outside while defining the oil path together with the motor housing.

6. The drive motor of claim 5, wherein the motor internal space includes the oil path, in which the oil circulates such that the oil discharged from a hollow motor shaft passes through the stator and then flows into the motor shaft, and
   wherein the temperature of the oil decreases by heat exchange between the oil and the coolant while the oil passes through the stator.

7. The drive motor of claim 5, wherein:
   the oil path comprises a shaft path, a motor cover path, a motor housing path, and a reducer cover path; and
   the shaft path is defined in the motor shaft, the motor cover path is defined in the motor cover, the motor housing path is defined in the motor housing to be disposed adjacent to the coolant channel, and the reducer cover path is defined in the reducer cover.

8. The drive motor of claim 1, wherein the stator surrounds a magnet coupled to a motor shaft.

9. The drive motor of claim 8, wherein the motor shaft is supported by a motor front end bearing and a motor rear end bearing, and the motor front end bearing is an oil-lubricated bearing.

10. The drive motor of claim 8, wherein the motor shaft is connected to a hollow reducer shaft in which the oil flows, and the reducer shaft constitutes a reducer filled with the oil.

11. An eco-friendly vehicle comprising:
a drive motor according to claim 1,
wherein the drive motor further comprises:
   a hollow motor shaft coupled to a magnet surrounded by a stator having a current so that both portions of the motor shaft are supported by oil-lubricated bearings; and
   a coolant circulation system configured to circulate the coolant by the drive motor,
wherein the coolant circulates around the motor housing surrounding the stator, and
wherein the oil path is defined in a motor internal space which is defined by a motor cover and a reducer cover that are coupled to respective left and right sides of the motor housing.

12. The eco-friendly vehicle of claim 11, wherein the drive motor is filled with the oil, and the oil exchanges heat with the coolant so that the temperature of the oil decreases.

13. The eco-friendly vehicle of claim 12, wherein the oil circulates inside the drive motor, and the coolant circulates outside the drive motor.

14. The eco-friendly vehicle of claim 11, wherein the coolant circulation system is connected to the drive motor by a coolant line to circulate the coolant.

15. The eco-friendly vehicle of claim 11, wherein the coolant circulation system includes a coolant reservoir and a pump.

* * * * *